(12) United States Patent
Keller

(10) Patent No.: US 8,367,133 B2
(45) Date of Patent: Feb. 5, 2013

(54) CAPSULE AND CONFIGURATION FOR FOAMING A LIQUID FOOD

(75) Inventor: Beat Keller, Zürich (CH)

(73) Assignee: Innostarter, Zurich (CH)

( * ) Notice: Subject to any disclaimer, the term of this patent is extended or adjusted under 35 U.S.C. 154(b) by 510 days.

(21) Appl. No.: 12/446,863

(22) PCT Filed: Nov. 1, 2007

(86) PCT No.: PCT/EP2007/061802
§ 371 (c)(1),
(2), (4) Date: Apr. 23, 2009

(87) PCT Pub. No.: WO2008/055845
PCT Pub. Date: May 15, 2008

(65) Prior Publication Data
US 2010/0092629 A1    Apr. 15, 2010

(30) Foreign Application Priority Data

Nov. 10, 2006  (CH) ........................... 1813/06
May 18, 2007  (CH) ........................... 0807/07

(51) Int. Cl.
*A23C 9/00* (2006.01)
(52) U.S. Cl. .......... 426/241; 426/433; 426/474; 99/452; 99/453; 99/295; 99/323.1; 99/293
(58) Field of Classification Search .................. 426/241, 426/433, 474; 99/452, 453, 295, 323.1, 293
See application file for complete search history.

(56) References Cited

U.S. PATENT DOCUMENTS

| | | | |
|---|---|---|---|
| 4,735,133 A | 4/1988 | Paoletti | |
| 5,473,972 A | 12/1995 | Rizzuto et al. | |
| 5,611,262 A | 3/1997 | Rizzuto et al. | |
| 6,289,796 B1 | 9/2001 | Fung | |
| 7,178,453 B2 * | 2/2007 | In Albon | 99/295 |
| 7,472,642 B2 * | 1/2009 | Stieger et al. | 99/293 |
| 7,607,385 B2 * | 10/2009 | Halliday et al. | 99/280 |
| 7,987,767 B2 * | 8/2011 | Hester et al. | 99/280 |
| 2006/0113408 A1 * | 6/2006 | Stieger et al. | 239/589 |

FOREIGN PATENT DOCUMENTS

| | | |
|---|---|---|
| DE | 40 35 270 A1 | 5/1991 |
| EP | 0 575 762 B1 | 12/1993 |
| EP | 0 919 776 B1 | 6/1999 |

(Continued)

OTHER PUBLICATIONS

International Preliminary Report on Patentability and Written Opinion and Translation of International Preliminary Report on Patentability and Written Opinion; International application No. PCT/EP2007/061802; International filing date: Nov. 1, 2007, mailed May 22, 2009 and Jul. 23, 2009.

(Continued)

*Primary Examiner* — Anthony Weier
(74) *Attorney, Agent, or Firm* — Antonelli, Terry, Stout & Kraus, LLP.

(57) ABSTRACT

For the production from a liquid food of an at least partially foamed food, in particular at least partially foamed milk or a milk product, the liquid food, which is contained in a container (1) or a capsule-type formation, is expelled from the container or the capsule, and at least partially foamed and subsequently expelled by generating an at least partially turbulent flow.

18 Claims, 10 Drawing Sheets

FOREIGN PATENT DOCUMENTS

| | | |
|---|---|---|
| EP | 1 532 909 B1 | 5/2005 |
| EP | 1 688 075 B1 | 8/2006 |
| GB | 717 784 A | 11/1954 |
| WO | WO 01/88187 A1 | 11/2001 |
| WO | WO 2005/063093 A | 7/2005 |
| WO | WO 2005/074770 A1 | 8/2005 |
| WO | WO 2006/043808 A | 4/2006 |

OTHER PUBLICATIONS

International Search Report and Written Opinion; PCT/EP2007/061802; International Filing Date: Nov. 1, 2007.

* cited by examiner

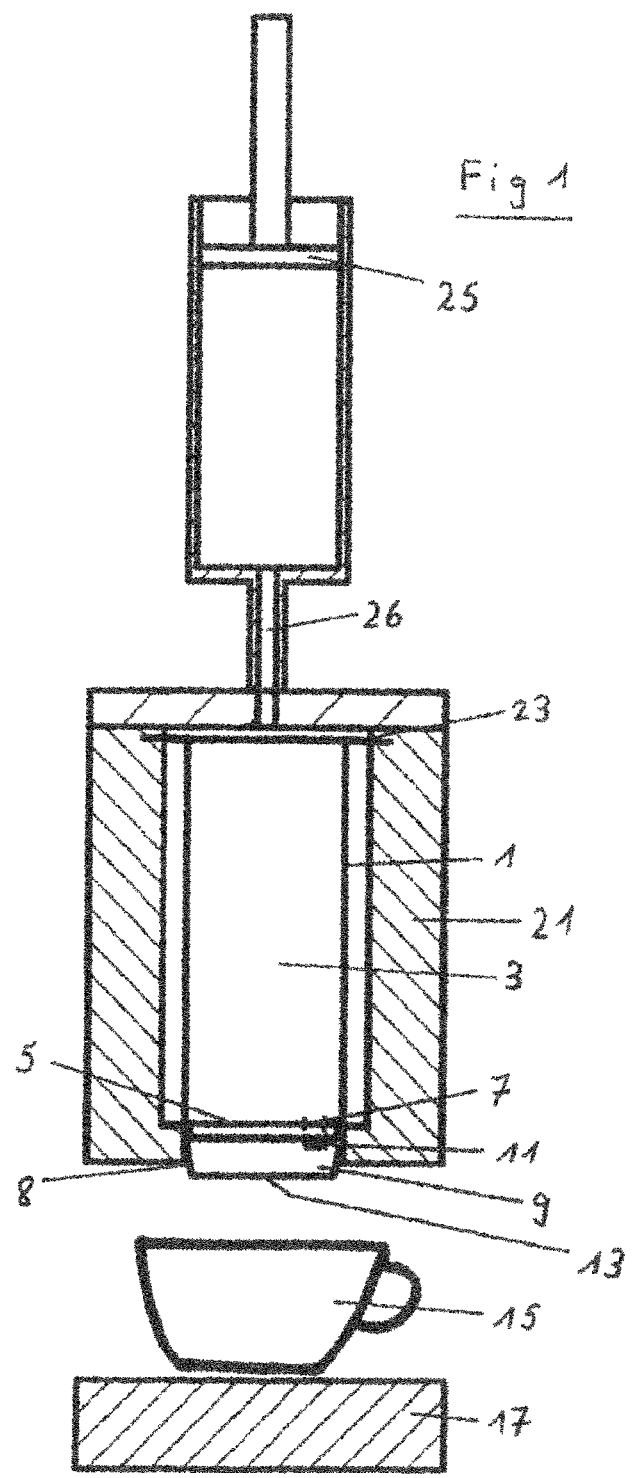

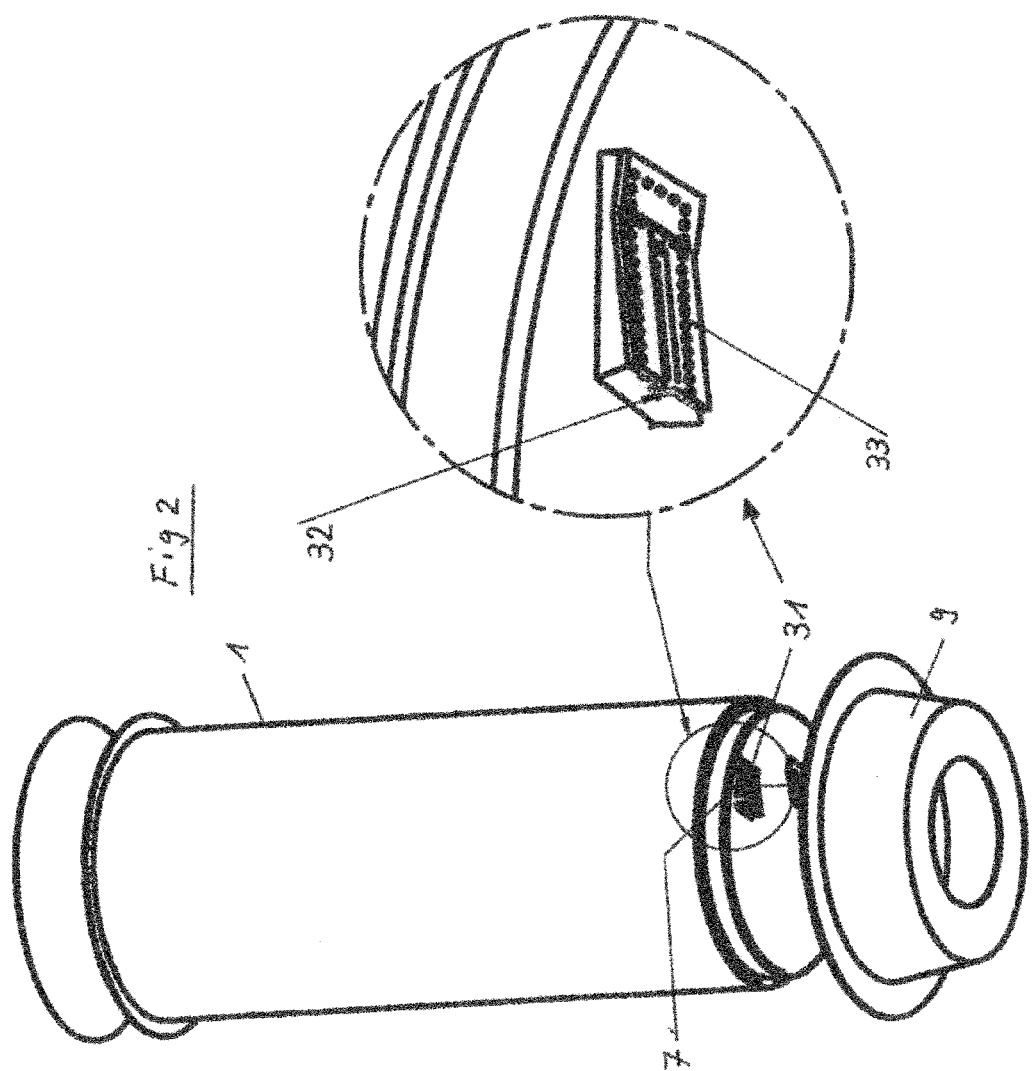

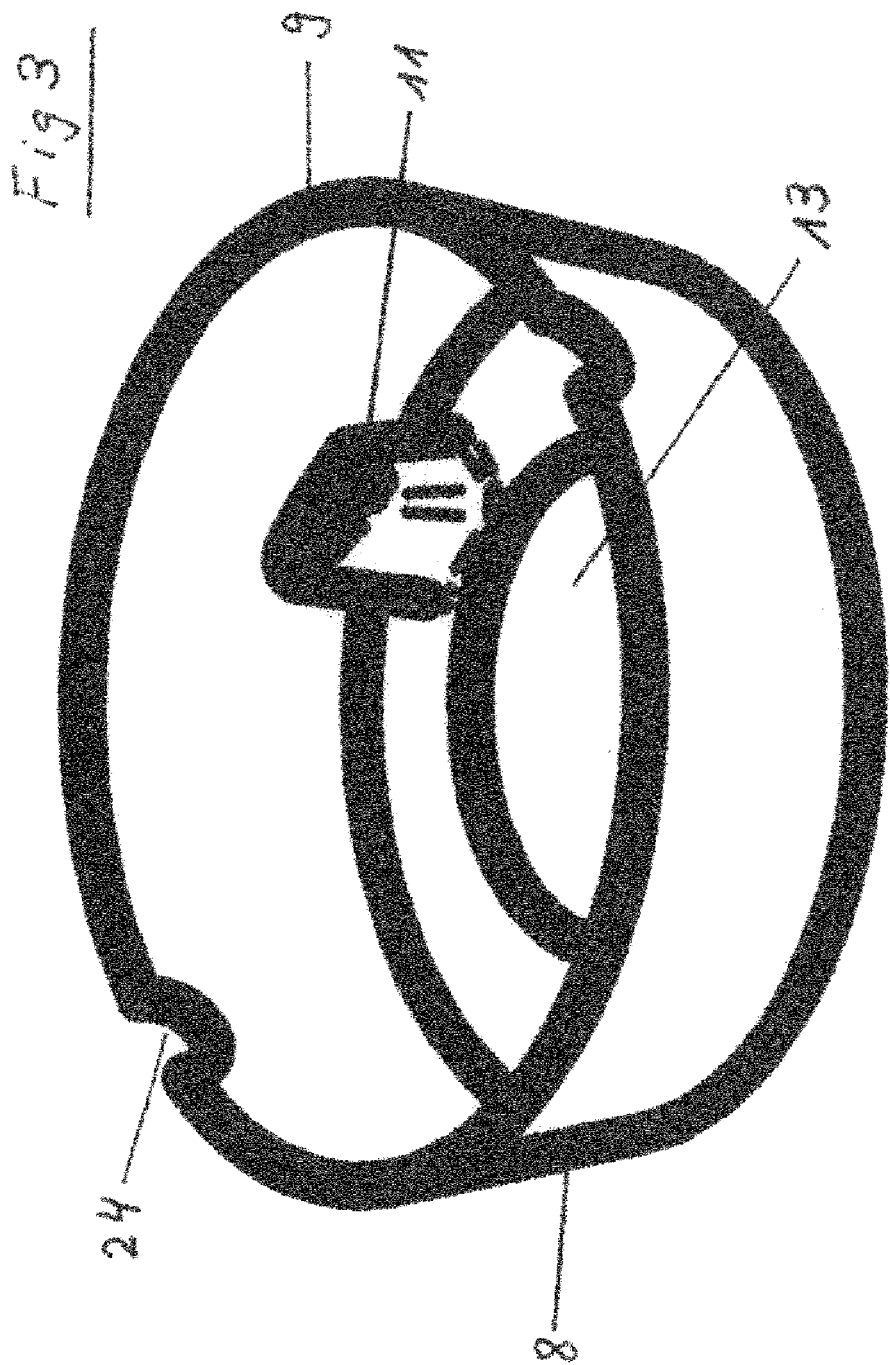

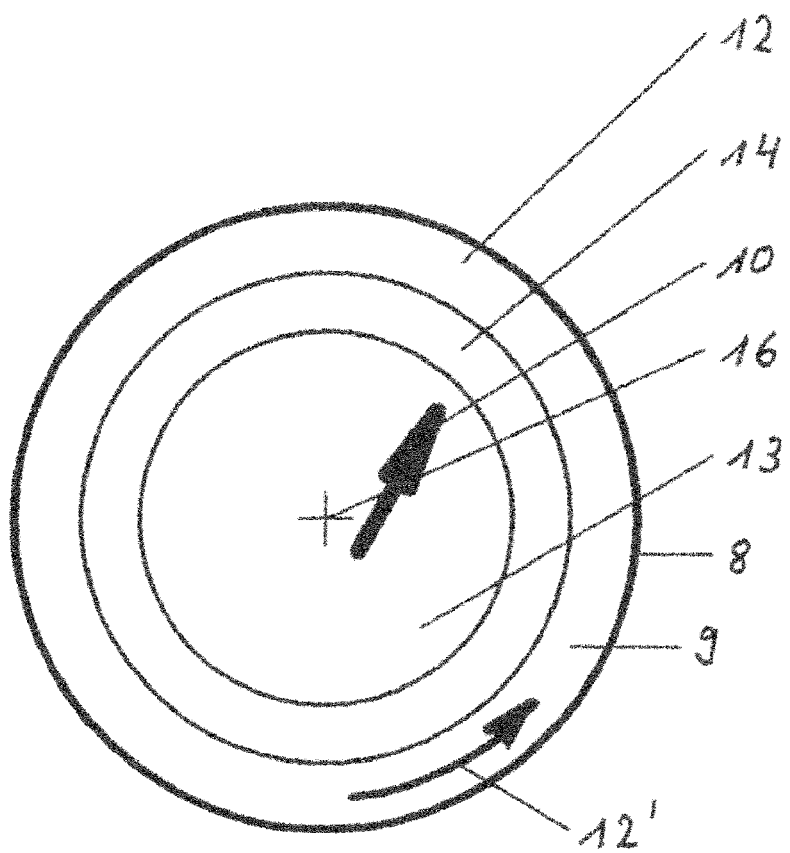

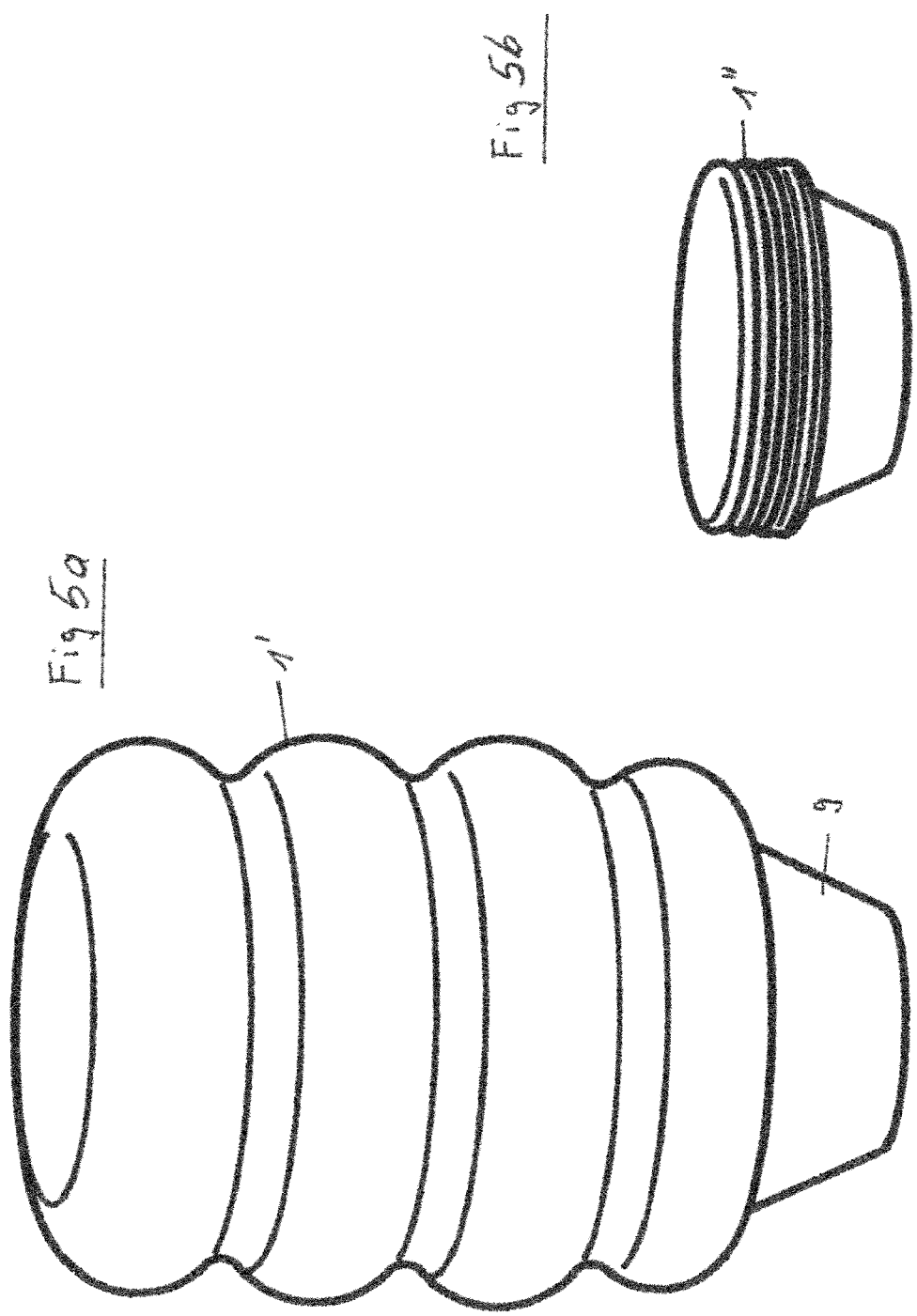

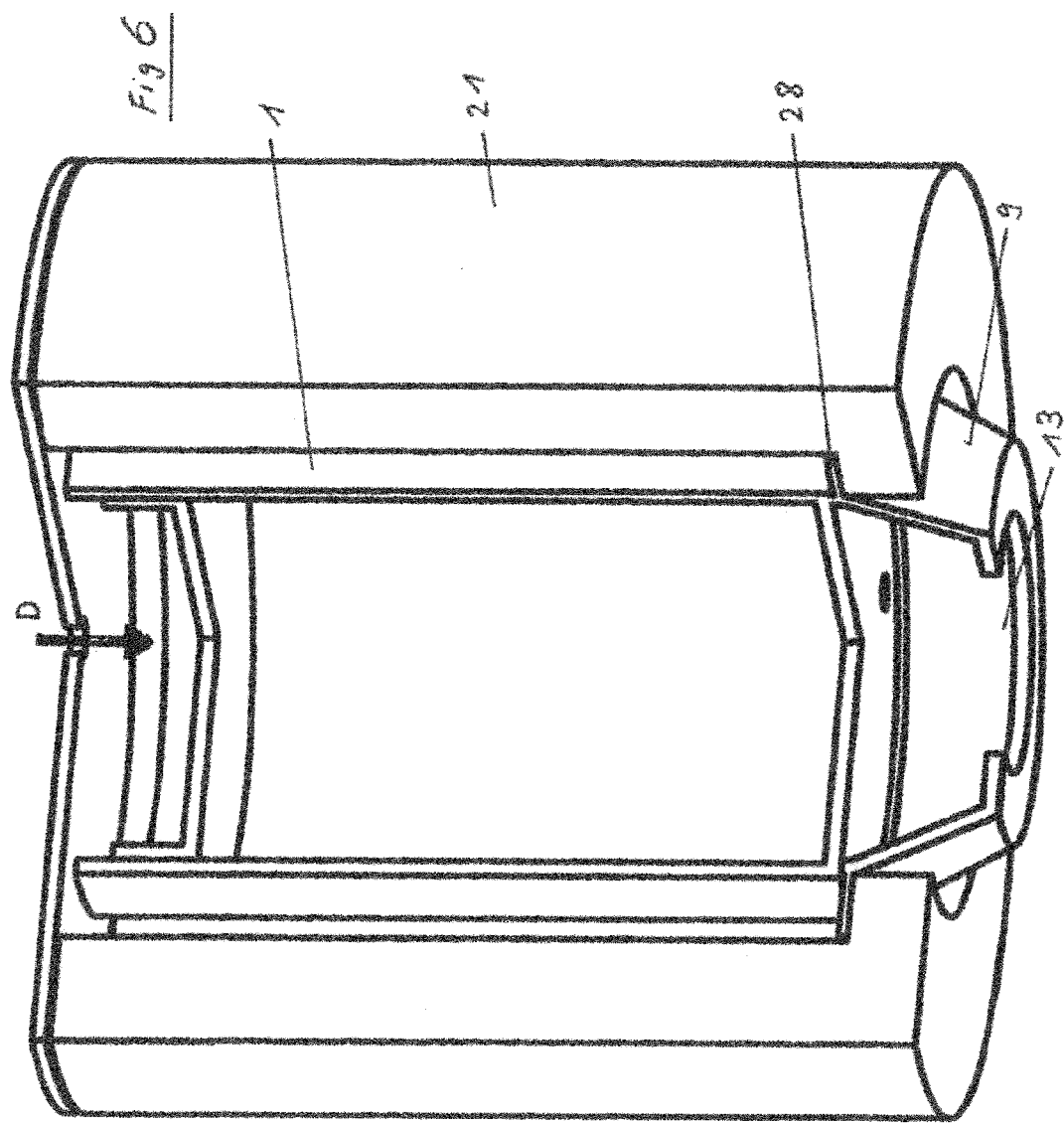

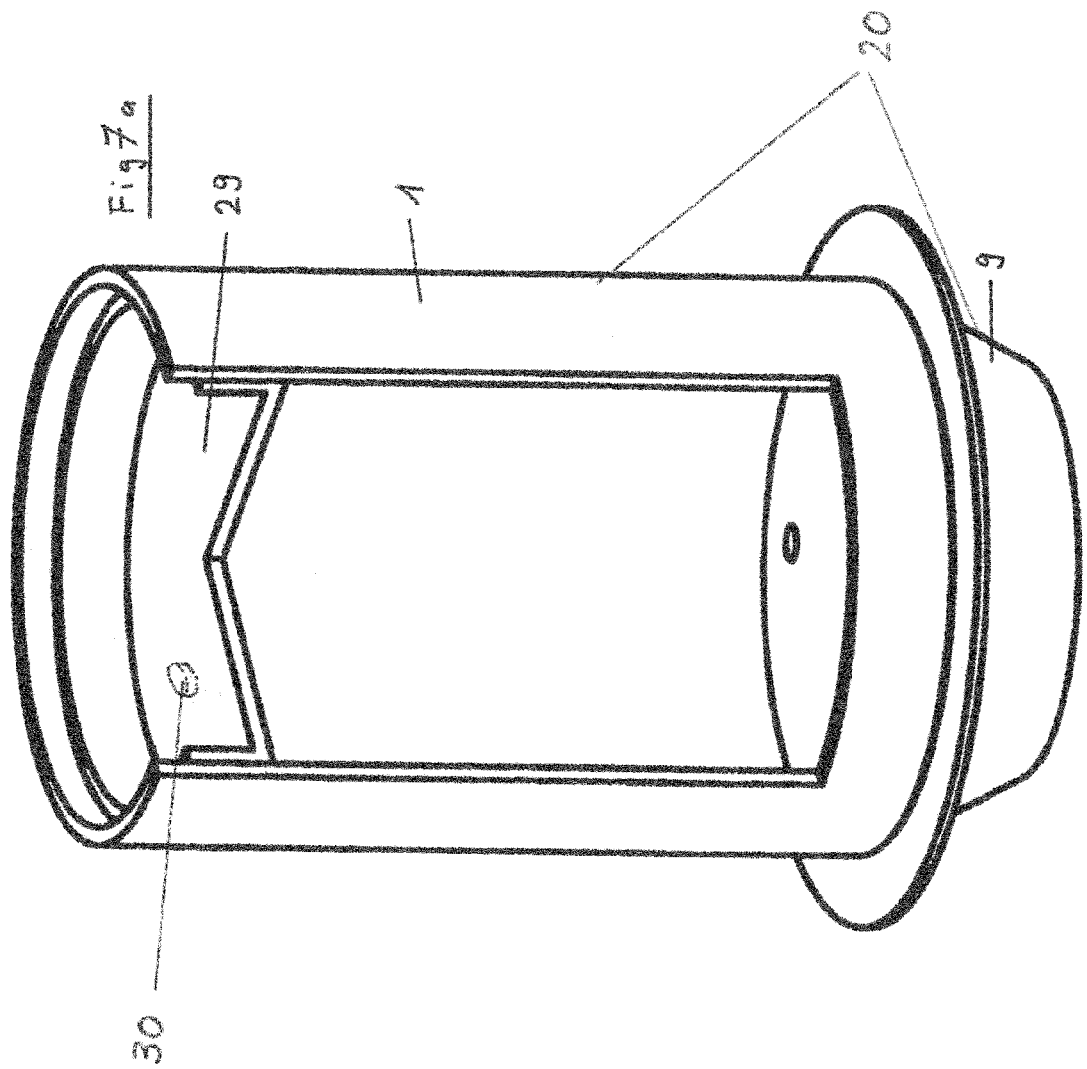

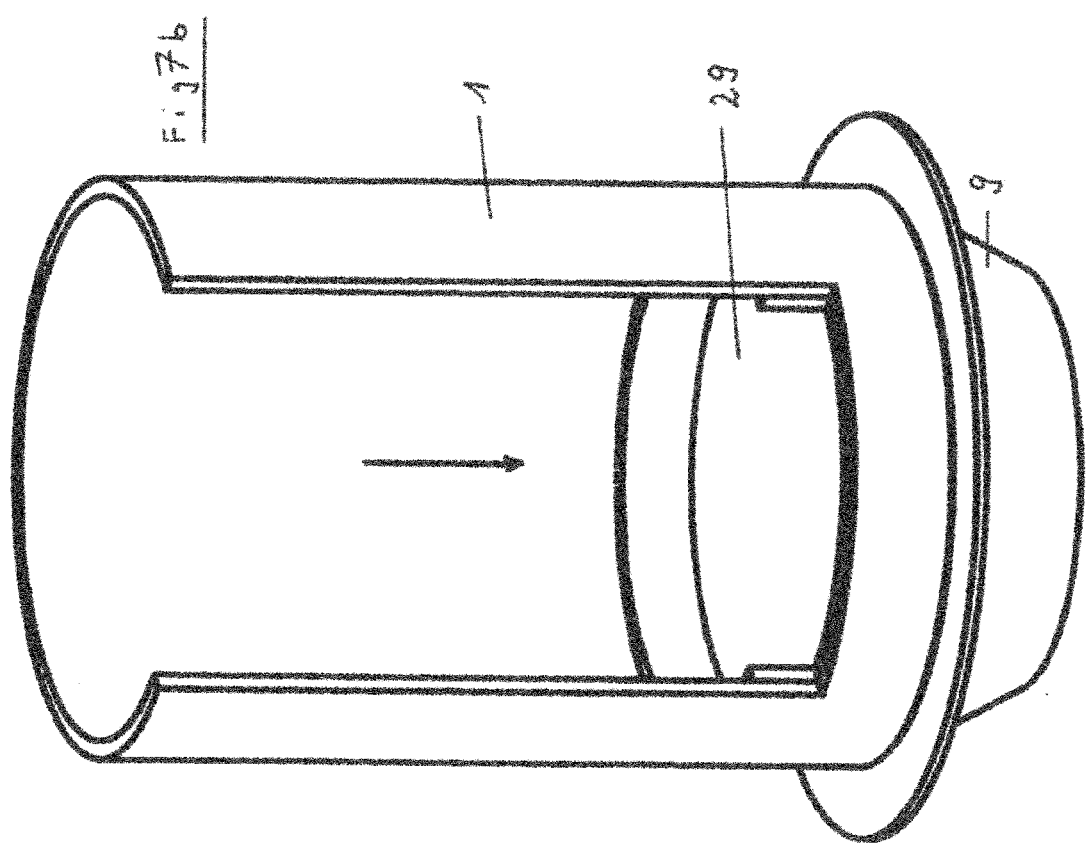

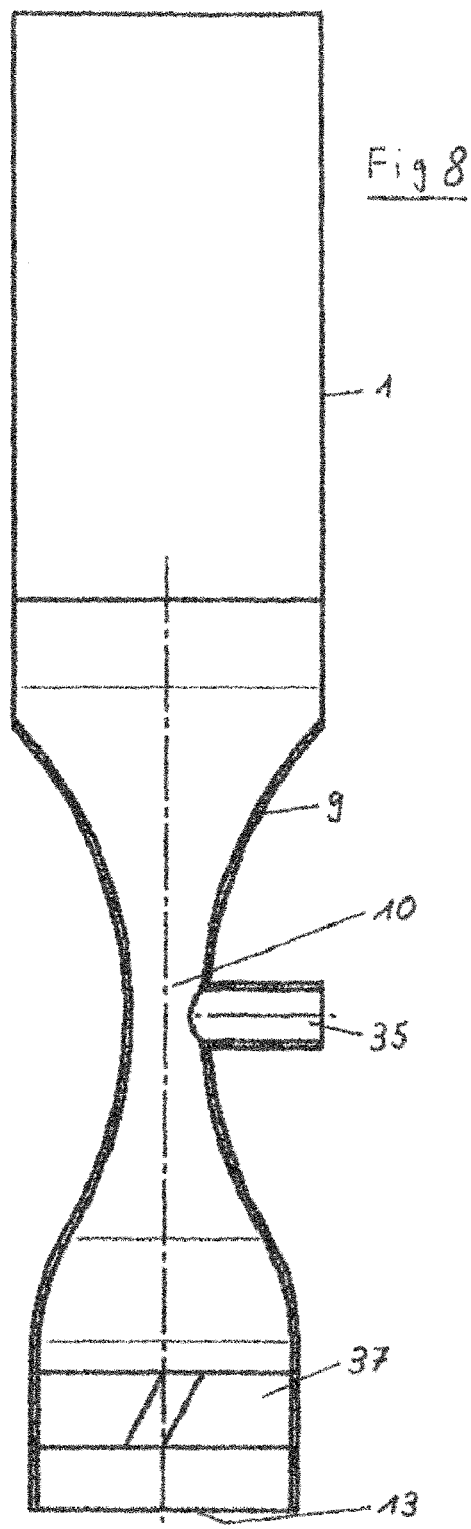

Fig 9
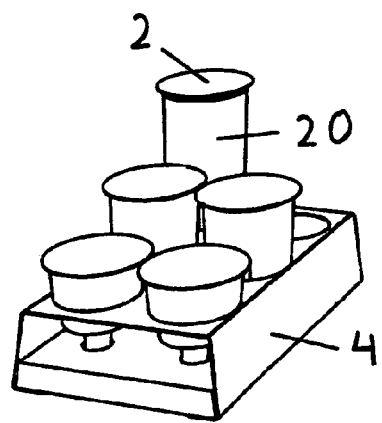
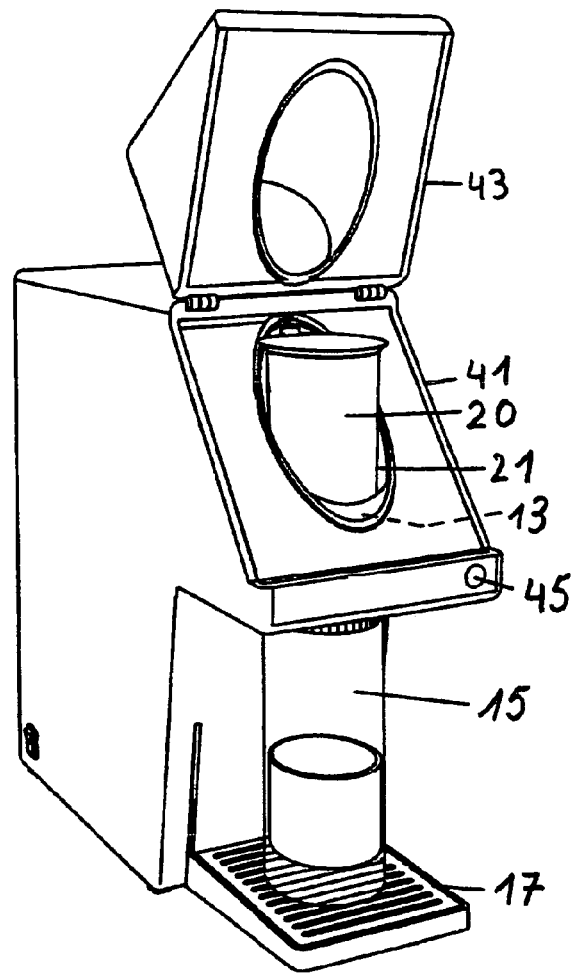

CAPSULE AND CONFIGURATION FOR FOAMING A LIQUID FOOD

RELATED APPLICATION

This application is a U.S. national phase application under 35 U.S.C. §371 of International Application No. PCT/EP2007/061802 filed Nov. 1, 2007, which claims priority of Switzerland Application No. 1813/06 filed Nov. 10, 2006 and Switzerland Application No. 807/07 filed May 18, 2007.

TECHNICAL FIELD

The present invention relates to a method for producing an at least partially foamed food, such as at least partially foamed milk in particular, a configuration for making an at least partially foamed food, a capsule-type container for making a foamed food, and finally a coffee machine having a configuration.

BACKGROUND AND SUMMARY

Coffee production is increasingly being performed using so-called capsule systems. Coffee powder is deposited in a coffee machine packaged in capsules or bags, the capsules are at least partially destroyed, and the powder is dissolved using hot water to deliver the coffee in the desired form and/or type of preparation.

If milk is needed for a cappuccino or latte, for example, it is heated and foamed using hot steam and/or mechanically processed further for foaming if needed. Accordingly, the preparation of milk foam using hot steam is described in manifold publications. For example, the making of a milk foam using hot steam is proposed in EP 0 575 762, EP 1 688 075, WO01/88187, WO2005/074770, U.S. Pat. Nos. 4,735,133, 5,611,262, 5,473,972, 6,289,796, and DE4035270. Furthermore, EP 0 919 776 proposes swirling cold milk together with an airstream through a nozzle in order to make a milk foam. The use of additional hot steam is again proposed for the heating.

Finally, EP 1 532 909 proposes a device for making milk foam or milk foam beverages, the milk being driven out of a type of compressible bellows like an accordion through resistance passage elements having a rotationally-adjustable resistance passage disc. The compressible bellows is implemented in two parts, having an air chamber and a chamber containing milk. The rotationally-adjustable resistance passage disc together with the resistance passage elements, which is intended as a reusable part to be cleaned because of the complexity, is part of a coffee machine into which the compressible capsules can be deposited.

Contrary to the coffee preparation, the making of milk foam is complex and, if it is made using hot steam, the milk is partially watered-down by the hot steam and, in addition, the utensils and containers necessary for making the foam are contaminated.

It is an object of the present invention to propose a simplification of the milk processing, in order to handle it appropriately in at least partially foamed form for the production of a cappuccino, a latte, etc., for example, a contamination of apparatus parts such as a coffee machine in particular being prevented as much as possible.

Generalized, it is an object of the present invention to propose a method and a device in order to bring liquid foods into at least partially foamed form in a simple way.

The invention is solved using a method wherein the liquid food is held a container, the method comprising expelling the liquid food from the container and a least partially foaming the liquid food and subsequently discharging the at least partially foamed liquid food without supplying hot water steam, wherein said foaming includes making an at least partially turbulent flow of the liquid food.

It is proposed that the liquid food, which is to be at least partially foamed, is provided in a container, such as a capsule or a bag, the liquid food is heated if necessary while still in the container without supplying hot steam into the container, and is subsequently driven out of the container by making a pressure. The food driven out of the container is introduced into a device in which a turbulent flow is at least partially made, in order to foam the liquid food. Finally, the food is discharged from the container or the device in the desired form for further use, in order to produce a cappuccino, for example.

The expulsion of the liquid from the container may be performed, on the one hand, by compressed air in that compressed air is pressed into the interior through an opening in the container, or in that the container is compressed or a wall is displaced toward the interior. Either a nozzle-type opening may be opened automatically as a result of the compressed air, the opening may be performed by removing a slide, a membrane, etc., or the opening occurs by bursting or shrinking either the opening along a target breakpoint or a diaphragm.

The expelled liquid, which has been heated beforehand using microwaves, infrared, by supplying hot steam to the container, etc., in case of milk for making a cappuccino, for example, is introduced into a suitable device, injected, for example, such as a funnel, a swirling body, a hose-like device, etc., in order to generate a turbulent flow therein for the purpose of foaming. It is important that swirling is made possible using the air present in the device, to at least partially make foam. For this purpose, it is also possible to introduce additional air into the device from the outside, or it may be sucked in automatically because of the flow in the device.

Finally, the foam-like liquid, such as the milk foam, is discharged through a discharge opening, such as a nozzle, in order to make a cappuccino in a coffee cup, for example.

Further preferred embodiment variants of the method according to the invention are described hereinafter.

A configuration is accordingly proposed for making an at least partially foamed food, such as foamed milk in particular. The configuration has at least one container, which is intended for providing the foamed liquid. The container may be such that the liquid may be expelled either by externally supplied compressed air, or the walls are such that they are compressible and/or displaceable inward.

Furthermore, the configuration has a device which is preferably connected to the container, into which the liquid may be injected and/or introduced from the container, and in which a turbulent flow of the liquid may be generated and/or the liquid may be mixed by swirling using air. The device may be like a funnel, may have any type of flow screens, direction reversal screens, constrictions in the flow of the liquid, an external air supply, etc. It is essential that the liquid is foamed by corresponding measures.

According to one embodiment variant, it is possible to connect the container integrally to the device to form a one-part capsule.

Furthermore, the configuration may have a heating assembly, such as a microwave, an infrared assembly, a hot steam generator, etc., in order to heat the liquid in the container before the expulsion into the device. If hot steam is used, it is advantageous if it does not come into contact with the liquid food.

Finally, the container or the device has a discharge opening and/or a discharge nozzle, through which the foamed food, such as the foamed milk, may be expelled.

Preferred embodiment variants of the configuration according to the invention are also disclosed below.

Finally, a coffee machine is proposed having a receptacle, into which the configuration according to the invention and/or the above-mentioned capsule may be introduced, and which has corresponding apparatuses in order to keep the milk, in order to make steam or compressed air, or in order to mechanically compress the container, etc., for example.

The advantage of a coffee machine proposed according to the invention of this type is that the configuration and/or the capsule for making the milk foam may be introduced quasi-autonomously into the coffee machine and may be removed therefrom again after making the milk foam, like the currently known coffee powder capsules or bags cited at the beginning, for example. No parts of the coffee machine are contaminated in any way, the configuration according to the invention may merely be disposed of as a disposable consumable article, for example, composted, if the individual components are manufactured from biologically degradable materials.

BRIEF DESCRIPTION OF DRAWINGS

The invention will be explained in greater detail for exemplary purposes and with reference to the appended figures.

In the figures:

FIG. 1 schematically shows a configuration according to the invention for making milk foam in cross-section, FIG. 2 schematically shows a closure for closing the container on the basis of individual parts of a configuration, FIG. 3 schematically shows a device for making a turbulent flow for making the foam in perspective, FIG. 4 shows a horizontal section through the milk foaming device according to FIG. 3

FIGS. 5a,b shows a possible embodiment variant of a container for providing the liquid, FIG. 6 shows a further embodiment variant of a container according to the invention in perspective, FIGS. 7a,b in turn shows a further embodiment variant of a container according to the invention or a capsule FIG. 8 schematically shows a further embodiment variant of a configuration according to the invention for making a foam, such as a milk foam, and FIG. 9 shows a concrete exemplary embodiment of a device for making milk foam.

DETAILED DESCRIPTION

FIG. 1 schematically shows a cross-section of a configuration according to the invention for making an at least partially foamed food, such as foamed milk in particular. A capsule-type container 1, for example, having an upper edge 23 for holding the container in a corresponding housing receptacle 21, such as a coffee machine, contains the liquid food 3 to be foamed, such as milk. The lower terminal wall 5 may be implemented as linear or slightly funnel-shaped, for example, having an opening 7, which is still closed beforehand and which may be implemented as not central, but rather laterally offset and directed diagonally downward, for example. A funnel-type device 9, for example, is provided below the container 1, which is either connected integrally fixed to the container 1 or is in turn held in the receptacle 21 using lateral projections, for example. This device 9 may also have a funnel-type wall 8, opening into a downward redirected opening 13, which may be implemented as nozzle-like, for example. For example, flow screens 11 may be provided along the interior of the funnel-shaped wall 8, whose mode of operation will be explained hereafter.

A bracket 17 may be provided below the opening 13, which belongs to a coffee machine, which has the receptacle 21 for the container 1. For example, a coffee cup 15, in which the hot coffee is already present, may be situated on the bracket 17.

Finally, a piston-like device 25 may be provided above the container 1, having a pressure line 26 which is provided for impressing the lid of the container 1 using pressure, for example.

The mode of operation of the configuration according to the invention is described hereafter, as shown in FIG. 1:

After introducing the container 1 together with the device 9 into the receptacle 21 of a coffee machine, for example, the making of the milk foam is triggered using a switch or push-button, for example. The milk 3 is first heated in the container 1, which may be performed using microwaves, infrared, or another suitable heating assembly, for example. The heating may also be performed using steam which flows around the container.

After the milk is heated, the piston 25, which impresses the upper wall of the container 1 and thus generates a certain pressure in the container 1, is actuated. A fine diaphragm on the discharge nozzle 7 is now pressed away, for example, or the opening may be performed automatically in another suitable way. The hot milk jet is injected into the funnel-shaped device 9, in which a certain swirling of the milk is generated, for example, as a result of the deflection screens 11. The spiral-shaped, foam-making liquid stream in the funnel-shaped device 9 finally reaches the opening 13, through which the foamed milk is discharged into the cup 15 situated underneath. The pressure buildup may also be performed, for example, using a pressure nozzle which penetrates the upper lid of the container 1 instead of a piston.

After completed discharge of the milk foam, for example, the container 1 may be automatically ejected with the device 9 into a corresponding chamber provided for this purpose, or may be manually removed. It is obvious that no parts of the coffee machine having the receptacle 21 come into contact with milk in any way. Therefore, there is no contamination and the coffee machine does not have to be cleaned after completed use.

Because hot steam is not used for heating the milk and subsequently making the milk foam, the milk in the produced foam is also not watered down.

FIG. 2 shows a possible embodiment variant of a container according to the invention, having a closure sticker 31, which is situated on the container 1 to close the opening 7. The closure sticker may be situated, for example, in such a way that it has target breakpoints 32, on the one hand, and is connected fixed to the container floor along a lateral line 33, so that the sticker may not reach the funnel-like device 9 even when it is pressed away. The cup-like funnel 9 may either be a separate component connectable to the container 1, or it may be integrally connected to the container 1 to form a one-part capsule.

FIG. 3 shows a possible embodiment variant of a funnel-like device 9, having a collar-like funnel-like wall 8, and a deflection screen 11, against which the hot liquid milk may be sprayed by the nozzle 7. Air is correspondingly sucked downward through the opening 13 by the relatively high velocity of the rotating milk, a certain swirling of the milk and thus milk foam as a product resulting. Finally, this foam is discharged downward through the opening 13. In order that the device may be held in the correct position in the receptacle 21, possibly together with the container, it is possible to provide so-called positioning aids 24, for example.

FIG. 4 shows a horizontal section through a milk foaming unit similar to that shown in FIG. 3. The milk is injected in a sharp jet in the arrow direction 10 having a tangential component into the annular chamber 12 of the device 9. A rotating milk layer results, the milk experiencing a first foaming through the strong turbulence of the incident jet. The rotation occurs in the arrow direction 12' around the rotation center 16 of the device 9, having a funnel-like wall 8, for example. In this type of foaming, a quite coarse-pored and unstable foam initially arises, which is pulverized upon further passages through the milk jet and the desired fine-pored stable foam 14 thus arises. The air required for this purpose is suctioned through the outlet opening 13.

FIGS. 5a and 5b show a further possible embodiment variant of a container according to the invention, implemented in the form of a bellows, for example. FIG. 5a shows the container 1', placed on the funnel-shaped device 9 in the starting position, containing the liquid, such as milk. In FIG. 5b the bellows-like container is shown compressed and identified by the reference numeral 1". Due to this bellows-like implementation of the container, it is easily compressible by applying pressure or using a piston-like instrument.

FIG. 6 in turn shows a further embodiment variant of a cuplike container 1 according to the invention in perspective, placed on a funnel-shaped device 9. The funnel-like device 9 has an upper retention ring 28, which is provided to situate the cup 1 in a corresponding receptacle 21, for example, in a coffee machine, in the correct position. By applying compressed air D, the milk may again be driven out of the cup 1 into the funnel-shaped device 9, where the foam is made. Finally, the milk foam goes through the opening 13 to be discharged into a coffee cup, for example.

A further embodiment variant of a cup 1 according to the invention is in turn shown in FIGS. 7a and 7b, having an upper wall 29, implemented as a piston, for example, which may be pressed along the wall by applying an appropriate tool. In other words, the cup 1 is implemented like a cartridge, and may be connected integrally directly to the funnel-shaped device 9, as in the preceding examples, to form a one-piece capsule 20, in which the swirling of the expelled milk may be performed. Instead of a piston-like upper wall, a diaphragm-like wall which is situated fixed may also be provided, which may be pierced using a nozzle-like or pin-like device in an area 30 (shown by dashed lines), for example, in order to build up the pressure in the interior 29' of the upper container area.

FIG. 8 shows an embodiment of the configuration according to the invention schematically in section, which is different in that the cup is not placed on a funnel-shaped configuration 9 here, but rather connected to a foam-forming body implemented like a Venturi tube and/or placed thereon. A channel-shaped passage 10 is provided having a tapering cross-section, into which a lateral air pipe 35 opens, for introducing air, steam, or compressed air. As a result of the increased passage velocity of the milk expelled from the cup 1, air is sucked in laterally, and the actual milk foam is formed in downstream swirling body 37, such as a so-called twist body, for example. Finally, this foam is in turn discharged downward through the opening 13, for example, into a coffee cup.

Finally, FIG. 9 shows a device 41 for making milk foam, for example, a cappuccino, a latte macchiato, etc. A capsule 20 containing milk is introduced into a corresponding receptacle 21, after which a lid 43 is folded down on the upper opening of the capsule 20. In the receptacle chamber 21 thus closed, by actuation using a switch 45, the milk in the capsule 20 is first heated and subsequently the milk is expelled out of the container area into the flow area using a displaceable piston or by generating pressure or by introducing compressed air into the capsule, for example. The expulsion is performed similarly to the descriptions as cited with reference to FIG. 1 and the following figures, the device responsible for making the milk foam and/or the funnel-like cup being connected integrally to the container area to form the capsule. The foam thus made is sprayed into the container 15 such as a cup or mug containing coffee to make the corresponding desired coffee.

Depending on the coffee to be produced, whether cappuccino, latte, latte macchiato, etc., a corresponding capsule 20 may be selected from a stand 4, this capsule 20 initially being closed by a corresponding lid 2. The closure 2 may either be removed before the introduction into the device 41, or does not have to be removed to make the milk foam.

The container or the capsule 20 (container 1+funnel-shaped device 9 connected integrally to one another) is preferably a disposable formation, which must be as cost-effective as possible. This means that the container or the capsule is to be producible as much as possible in a cost-effective production method, for example, using deep-drawing methods. The container or the capsule may either be manufactured from a polymer material, or from aluminum or another suitable material, which may be recycled after use.

The exemplary embodiments shown in FIGS. 1 through 9 are, of course, only embodiment variants to explain the present invention. The invention is not limited in any way to the embodiments and, of course, any other type of containers for providing the milk and also other embodiments for the production of the milk foam may be selected.

As noted at the beginning, the present invention is also not limited in any way to the production of milk foam, but rather the methods and also devices proposed according to the invention may be used in general for the production of a foam from a liquid food.

The great advantage of the configuration and/or the method according to the invention is, as already mentioned above, that foam may be made in the simplest possible way, without the surroundings being contaminated in any way. The effort for making foam and also the cleaning and disposal of the diverse containers and/or capsules are extremely simple.

The invention claimed is:

1. An integrally formed capsule for making an at least partially foamed liquid food in a device which removably accepts the capsule for expelling at least partially foamed liquid food out of the capsule, the capsule comprising:
   at least one area provided for the storage of a liquid food,
   at least one further area to foam the liquid food, a separation provided between the area and the further area, the separation being at least partially interruptable mechanically or upon pressure on one area, in order to drive the liquid food into the further area for foaming,
   at least one discharge element on the further area, the discharge element having a discharge opening configured to discharge the foamed food into a container beneath the element without contaminating the any parts of the device coming into contact with the food, and
   wherein the separation is implemented in such a way that the liquid food is at least partially foamed upon introduction of the liquid food into the further area.

2. The capsule according to claim 1, further comprising means in the further area for setting liquid food introduced into the further area from the area into a turbulent flow in such a way that it foams.

3. The capsule according to claim 2, wherein the means is at least one of funnel-like and cup-shaped, and has at least one of flow screens and impact cams along an inner surface of the means for generating at least one of the turbulent flow and the foaming of the liquid.

4. The capsule according to claim 1, wherein the one area is at least one of easily deformable and compressible and wherein the separation has a discharge opening, which is opened automatically by generating a pressure in the one area.

5. The capsule according to claim 1, wherein the separation includes at least one wall which is displaceable by external pressure or piercable using a nozzle in the area in such a way that an increased pressure may be generated in the area.

6. The capsule according to claim 1, wherein the capsule is at least one of a single-use formation and a disposable article.

7. A method for producing from a liquid food an at least partially foamed food using a capsule according to claim 1, the method comprising holding the liquid food in the one area, expelling the liquid food from the one area into the further area and at least partially foaming the liquid food upon introduction of the liquid food into the further area and subsequently discharging the at least partially foamed liquid food without supplying hot water steam, wherein said foaming includes making an at least partially turbulent flow of the liquid food.

8. The method according to claim 7, including heating the one area of the capsule having the liquid food without supplying steam into the capsule or the liquid food area therein, and subsequently expelling the heated liquid food from the one area into the further area, at least partially foaming the liquid food, and subsequently discharging the at least partially foamed liquid food.

9. The method according to claim 8, including heating the liquid food, in the capsule using microwaves or infrared energy.

10. The method according to claim 7, wherein said expelling is performed by one of compressed air, by impression, and by displacing a wall toward the interior of the capsule to generate excess pressure, and wherein subsequently said foaming is performed in the further area connected to the one area.

11. The method according to claim 10, wherein said further area is a funnel-like or cuplike area, said method including introducing the liquid food expelled from said one area into said further area in such a way that an at least nearly spiral-shaped or circular flow arises, turbulence occurring due to at least one of asymmetrical injection of the liquid food into the further area and interaction of the liquid food with a configuration of at least one of screens and swirling bodies in the further area.

12. The method according to claim 7, wherein said foaming includes spraying the liquid food into a cup-like area in a sharp jet having a tangential component, whereby a rotating liquid layer results, whereby the liquid experiences a first foaming due to a strong turbulence of the incident jet, and a coarse-pored and unstable foam initially arises which is pulverized upon further passages through the liquid jet, by which a desired fine-pored stable foam results.

13. The method according to claim 7, wherein said foaming includes injecting the liquid food into the further area, having different cross-sections in a flow direction of the food to make a turbulent flow, and supplying air from outside the further area in areas of the further area having tapered cross-section to swirl the food.

14. The method according to claim 7, wherein said foaming occurs in the further area using so-called swirl or twist bodies, which are situated so as to be at least one of freely movable and freely rotatable.

15. A configuration for making an at least partially foamed liquid food the configuration comprising:
a container provided for the storage of a liquid food,
a device for expelling the liquid out of the container,
a flow device in which the expelled liquid is set into an at least partially turbulent flow for at least partially foaming the liquid food, and
a discharge element having a discharge opening configured for discharging the at least partially foamed food into a container beneath the element without any parts of the device coming into contact with the food,
wherein the container, the flow device, and the discharge element are integrally connected to form a capsule which is removably placeable in the device.

16. The configuration according to claim 15, wherein the flow device is at least one of funnel-like and cup-shaped, and has at least one of flow screens and impact cams along an inner surface of the flow device for generating at least one of the turbulent flow and the foaming of the liquid.

17. The configuration according to claim 15, wherein the device for expelling is a coffee machine which removably accepts the capsule.

18. The configuration according to claim 17, wherein the coffee machine is for at least one of making and discharging portioned coffee, in varying forms of consumption, further comprising a receptacle for at least one of coffee powder and powder in portion form, a heating device for making hot water, a mixing device for mixing the coffee powder with hot water, and a discharge element for discharging the brewed coffee powder, the coffee machine comprises a receptacle for situating the capsule containing liquid milk as the stored liquid food,
a heating element is provided for heating the milk,
the device for expelling expels the milk out of the container for making an at least partially turbulent flow of the milk in order to foam it or to expel the foam out of the capsule through the
discharge opening of the discharge element.

* * * * *